Aug. 25, 1925.                               1,551,078
F. T. TWAMLEY
SHOCK LOADING DEVICE
Filed Sept. 12, 1923      3 Sheets-Sheet 3
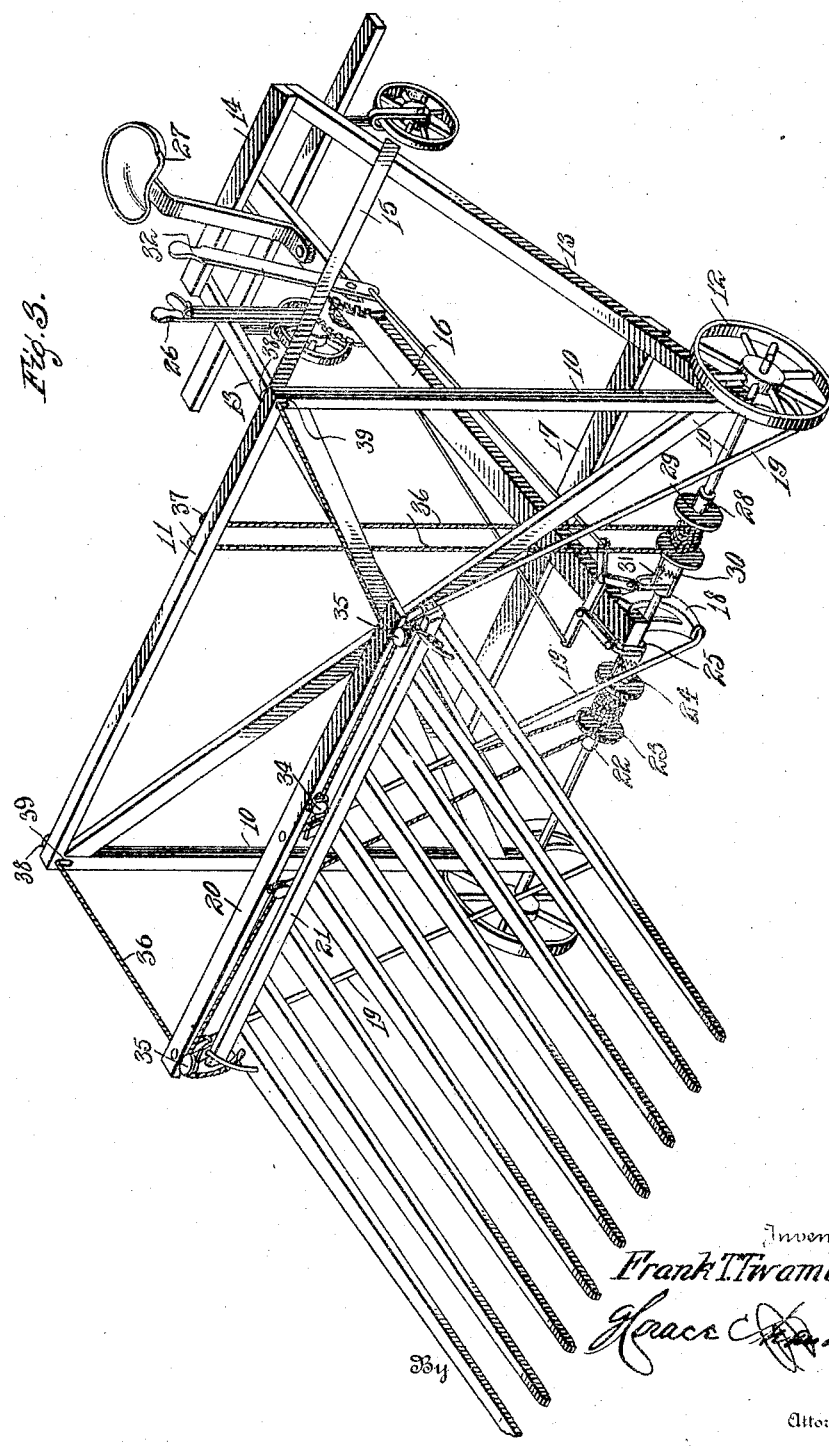
Inventor
Frank T. Twamley
By
Attorney Patented Aug. 25, 1925.

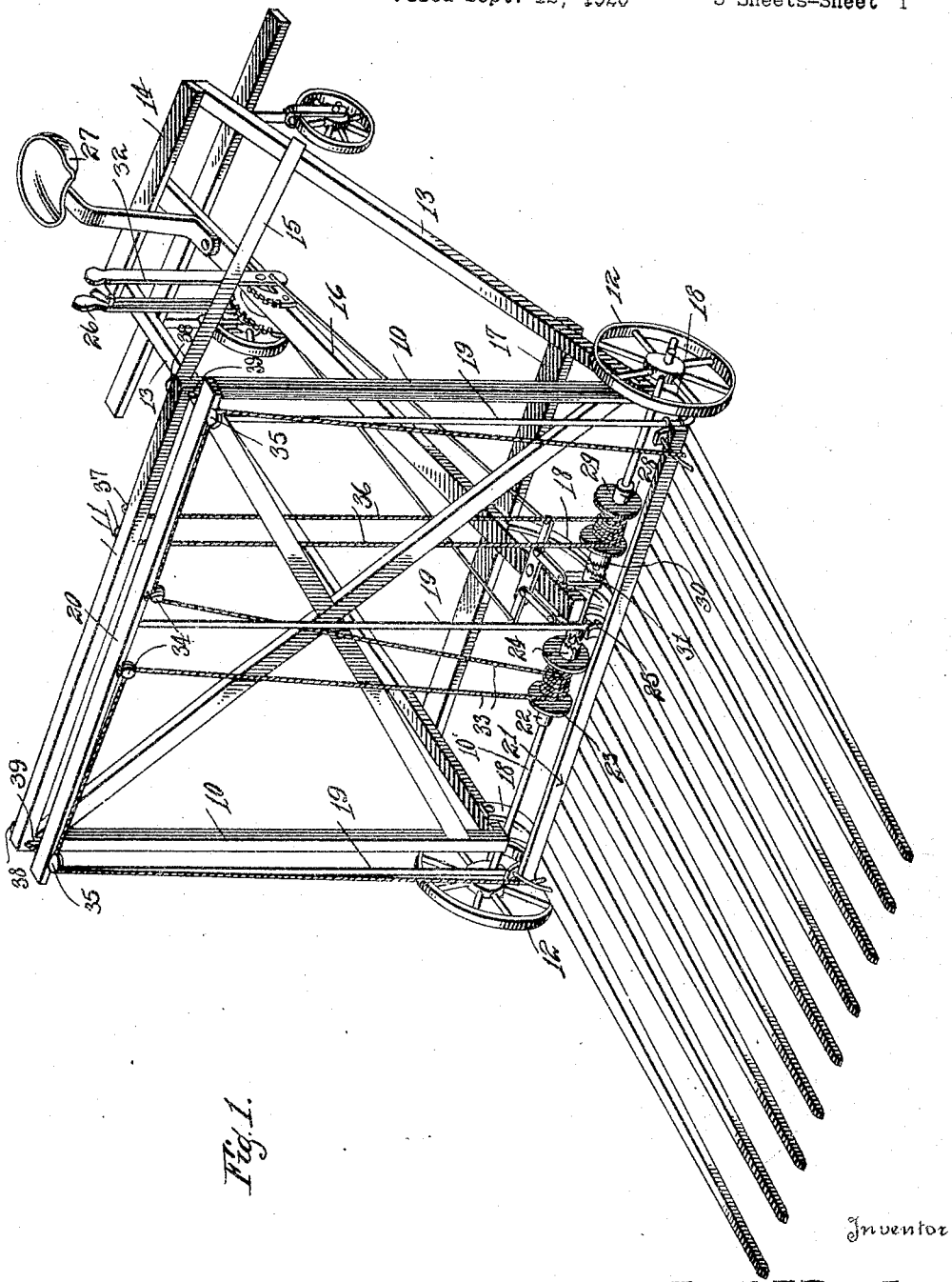

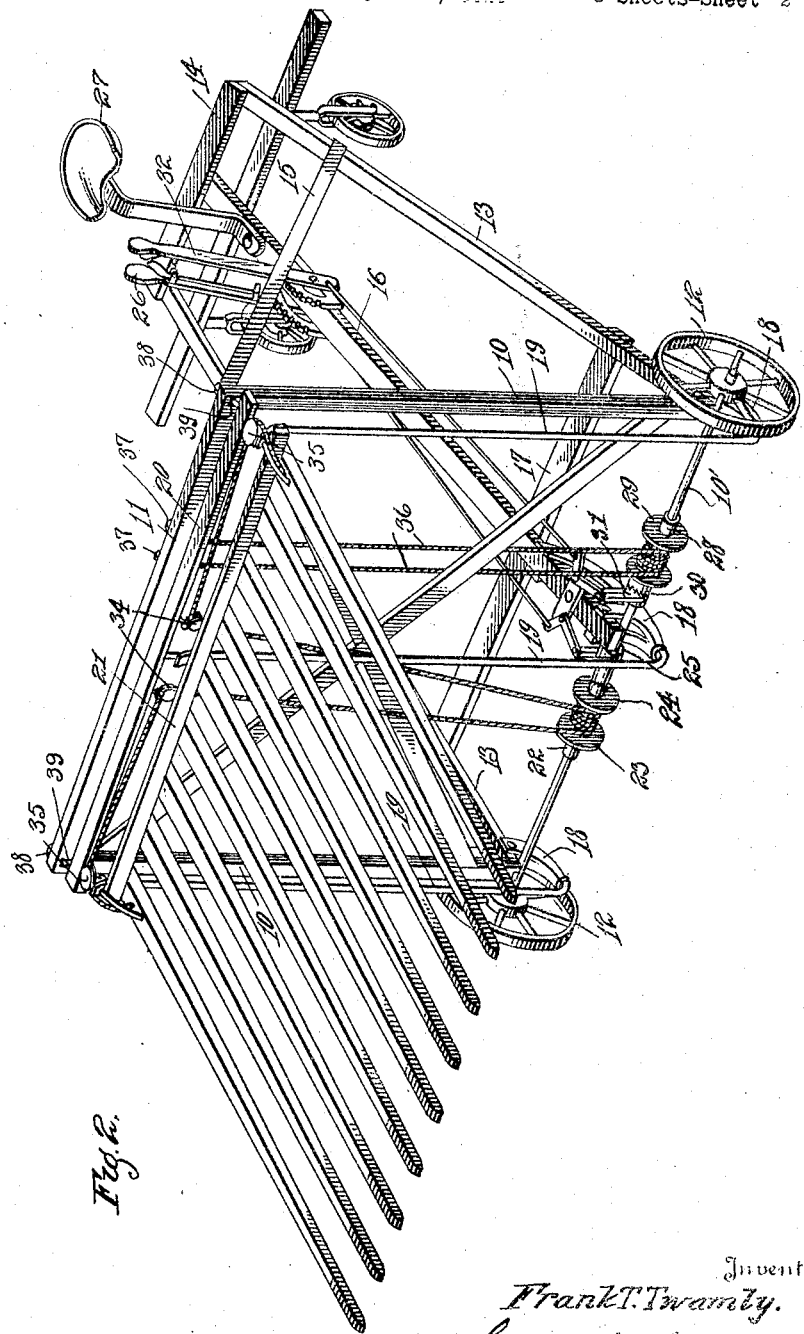

1,551,078

UNITED STATES PATENT OFFICE.

FRANK T. TWAMLEY, OF ST. VINCENT, MINNESOTA.

SHOCK-LOADING DEVICE.

Application filed September 12, 1923. Serial No. 662,287.

*To all whom it may concern:*

Be it known that I, FRANK T. TWAMLEY, a citizen of the United States, residing at St. Vincent, in the county of Kittson, State of Minnesota, have invented certain new and useful Improvements in Shock-Loading Devices; and I do hereby declare the following to be a full, clear, and exact description of the invention, such as will enable others skilled in the art to which it appertains to make and use the same.

This invention relates to new and useful improvements in shock loading devices.

One object of the invention is to provide a device which combines the functions of the ordinary bull-rake, and the loader, or device which lifts the shocks of hay onto the stack.

Another object is to provide a device of this character which is simple in construction, can be operated in an easy and efficient manner, and which will properly pick up, maintain and carry, and elevate the shocks of grain, hay, or the like material, onto the pile, cock, or stack.

Other objects and advantages will be apparent from the following description when taken in connection with the accompanying drawings.

In the drawings:

Figure 1 is a perspective view of a device made in accordance with the present invention, the same being in the position assumed when raking or picking up shocks.

Figure 2 is a perspective view of the device with the rake elevated preparatory to dumping the load.

Figure 3 is a perspective view of the device showing the rake in dumping position.

Referring particularly to the accompanying drawings, there is shown a vertical frame including the side member 10 and the upper transverse member 11, a transverse shaft 10' being rotatably supported in the lower ends of the vertical members 10, said shaft having the ground wheels 12 mounted on the ends thereof. Connected to the lower portions of the vertical members 10, and extending upwardly and rearwardly therefrom, are the parallel bars or beams 13, the same converging toward each other, at the rear, and being connected by the transverse beam 14. Suitable braces 15 extend from the beams 13 to the upper portions of the members 10, whereby there is thus produced a rigid frame structure, supported on the wheels 12, and capable of being moved from place to place. A central beam 16 extends from the center of the beam 14, to a point intermediate the lower ends of the members 10, and extending transversely between the beams 13, and being secured to this central beam 16, is a member or beam 17. Secured to the lower ends of the members 10, and to the forward end of the beam 16, are the depending brackets 18, and pivotally supported in the lower ends of these brackets are the lower ends of the upwardly extending bars 19, which bars have their upper ends connected to the ends and intermediate portions, respectively, of the transverse beam 20. These bars 19, and the beam 20, constitute a swingable frame, and rigidly carried by the lower ends of these bars 19, and extending forwardly therefrom, is the rake 21, the same being so connected with the swinging frame as to maintain a constant angle therewith, whereby the rake is capable of tilting toward and away from the ground.

On the intermediate portion of the shaft 10' is mounted a sleeve 22, which has a drum 23 on one end, and a clutch member on its other end, shown at 24. Fixed on the shaft 10', for rotation therewith, but slidable movement toward and away from the clutch member 24, is a clutch member 25, the same being operable by the lever 26, mounted on the main frame of the machine, adjacent the seat 27. Rotatable on the shaft 10' is a second sleeve 28, having a winding drum 29 thereon and a clutch 30 for co-operation with a clutch 31 splined on the shaft 10', and operable by a lever 32, on the main frame. Wound on the first drum 23 are the ends of the two cables 33, which extend upwardly over pulleys 34, on the intermediate portion of the beam 20, thence outwardly toward the ends of the beam, through pulleys 35, on the beam, and thence downwardly where they are secured to the rake 21, adjacent the inner end thereof. Secured to and wound on the other drum 29 are the ends of the two cables 36, which extend upwardly over pulleys 37, mounted on the intermediate portion of the beam 11, thence outwardly to the ends of the beam, where they pass over pulleys 38 mounted in openings 39, in the ends of the beam, and thence forwardly where they are secured to the ends of the beam 20.

When loading the rake is in lowered position similar to that shown in Figure 1, while the frame 19—20 is tilted forwardly, as shown in Figure 3. The machine is ready to be pushed to cause its rake to pass beneath shocks or bundles lying on the ground. When a sufficient load has been scooped onto the rake, the driver moves the lever 26, which throws in the clutch 25, so that the drum 23 will revolve and wind the cables 33, to tilt the frame 19—20 back into the position of Figure 1, together with the rake so that the forward end of the rake is slightly elevated from the ground, and the load maintained against rolling therefrom.
The machine is then moved to the stack, wagon, or other place of unloading, and assuming the wagon to be the point of unloading, the machine is pushed up to the wagon so that the tines of the rake are directed toward the wagon. The operator then moves the lever 32 to release the clutch 31, which permits the drum 29 to rotate and unwind the cables 36, whereupon the frame, comprising the bars 19 and beam 20, will swing forwardly to carry the rake forwardly and at a downward inclination, with the result that the load will slip therefrom, into the wagon. When the frame 19—20 is permitted to swing forwardly, as in dumping the load by releasing the clutch 25 the rake, will extend downwardly, due to its angular relation to the frame 19—20, thereby aiding the load to slip therefrom.

What is claimed is:

1. A combined rake and loading device includng a portable frame, a stationary frame on the portable frame, a tiltable frame mounted on the portable frame and movable toward and away from the stationary frame, a load scooping rake carried by the tiltable frame and movable vertically thereon, means for moving the rake with respect to the tiltable frame, and means for tilting the tiltable frame.

2. A combined rake and loading device including a wheeled frame, a stationary vertical frame fixed to the wheeled frame, a vertical frame movably connected at its lower end to the lower end of the wheeled frame and movable toward and away from the stationary frame, a rake mounted on the movable frame, means for swinging the movable frame toward and away from the stationary frame, and means for moving the rake vertically on the tiltable frame.

3. A combined gathering and loading device including a portable frame, a vertical stationary frame mounted on the portable frame, a vertical frame mounted on the portable frame and tiltable toward and away from the stationary frame, gathering means mounted on the tiltable frame, means for tilting the gathering means to maintain a load thereon, means for tilting the tiltable frame to further maintain the load, and means for elevating the gathering means into position to discharge its load, and means for releasing the tiltable frame and the gathering means.

In testimony whereof, I affix my signature.

FRANK T. TWAMLEY.